J. F. LUCAS.
GLUE-POT KETTLE.
No. 193,010. Patented July 10, 1877.
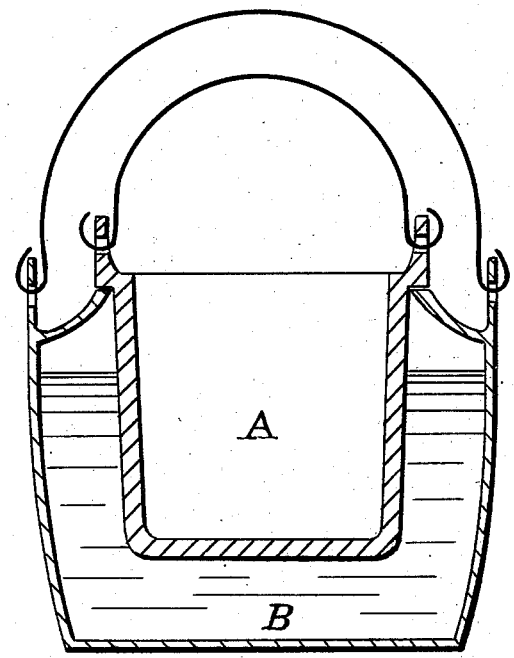
Witnesses:
A. P. Lacey.
P. B. Turpin.
Inventor
Joseph F. Lucas.
by G. B. Towles.
Attorney.

UNITED STATES PATENT OFFICE.

JOSEPH F. LUCAS, OF WASHINGTON, DISTRICT OF COLUMBIA, ASSIGNOR OF ONE-HALF HIS RIGHT TO JOSEPH H. FALCONER, OF SAME PLACE.

IMPROVEMENT IN GLUE-POT KETTLES.

Specification forming part of Letters Patent No. 193,010, dated July 10, 1877; application filed May 23, 1877.

*To all whom it may concern:*

Be it known that I, JOSEPH F. LUCAS, of Washington city, in the county of Washington and District of Columbia, have invented a certain new and useful Improvement in Glue-Kettles; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The figure in the drawing represents a vertical sectional view of my improved glue-kettle.

The object of this invention is to avoid the difficulties met with in the use of the present glue-kettle, owing to the use of a metallic holder in which the glue is heated.

The glue originally was made in a holder of metal alone, the oxidation of which would discolor the glue and ultimately injure its purity and adhesive quality.

Glue thus affected would evaporate and dry up after each heating, rendering it necessary in a short time to throw it away and make up a fresh pot of glue.

It was supposed that lining the interior of the holder with porcelain would remedy it, but experience has proved that a porcelain-lined holder will not do it, as the expansion and contraction of the metal crack the lining, and, in many instances, it comes off, thus exposing the glue to the oxidation of the metal and affecting it fully as badly as ever.

Galvanized sheet metal has been used, but it also would ultimately oxidize and affect the glue. The result has been that joints made from glue affected by the oxidation of the metal have not been durable, to say nothing of the waste and expense caused by throwing away the unused and injured glue.

It has been discovered by actual demonstration, after several months experience, that a holder made of glass will effectually remedy the difficulty, and that glue heated or made in a glass holder will retain a pulpy condition all through to the bottom thereof when cold, leaving a skim over the surface, thus keeping it perfectly free from being affected by any foreign substance whatsoever, and requiring less time to heat the glue again than before, and enabling it to be all used up without any waste except what may incidentally occur in applying it to the joints to be glued; also, permitting the brush to be freely withdrawn from the glue, which cannot be done with the brush in glue in a metallic holder, when it becomes cold, because of its being fast in the hardened and dried-up mass of glue, caused by reasons before stated.

This invention, therefore, consists of a glass holder, in combination with the kettle or pot, so as to preserve the purity and adhesive quality of the glue, thus effecting a saving in the use of the glue as well as in the cost of the kettle, and rendering the joints more durable than heretofore.

A is the glass holder, the sides and bottom of which are made about a quarter of an inch in thickness. B is the kettle. The glue is placed in the holder, which sets in the kettle containing water, and heated in the usual manner until the glue is fit for use.

It might seem to any one at first that a glass holder would not withstand the heat and subsequent cooling off to which the holder would be subjected in ordinary use, and that, therefore, it would be liable to break; but it is well known that glass becomes annealed when boiled in water; consequently, it is stronger and obviously well adapted for the purpose. Of course, if the holder should be taken out of the kettle and accidentally knocked off from some place it would be liable to break; but, as it can be made cheaper than the metallic holder, the cost of replacing it with a new one would be trifling compared with the results achieved in the saving of glue and in securing more durable joints.

Having thus fully described my invention, what I claim therein as new, and desire to secure by Letters Patent, is—

The glass holder A, in combination with the kettle B, substantially as and for the purposes set forth.

In testimony that I claim the foregoing as my own invention, I affix my signature in presence of two witnesses.

JOSEPH F. LUCAS.

Witnesses:
  G. B. TOWLES,
  S. M. POOL.